US009460518B2

(12) United States Patent
Kennedy et al.

(10) Patent No.: US 9,460,518 B2
(45) Date of Patent: Oct. 4, 2016

(54) VISUAL CLOTHING RETRIEVAL

(71) Applicant: Yahoo! Inc., Sunnyvale, CA (US)

(72) Inventors: Lyndon Kennedy, San Francisco, CA (US); Jia Li, Santa Clara, CA (US); Ioannis Kalantidis, Athens (GR)

(73) Assignee: YAHOO! INC., Sunnyvale, CA (US)

( * ) Notice: Subject to any disclaimer, the term of this patent is extended or adjusted under 35 U.S.C. 154(b) by 187 days.

(21) Appl. No.: 13/865,142

(22) Filed: Apr. 17, 2013

(65) Prior Publication Data

US 2014/0314313 A1   Oct. 23, 2014

(51) Int. Cl.
*G06T 7/00* (2006.01)
*G06K 9/00* (2006.01)

(52) U.S. Cl.
CPC ......... *G06T 7/0079* (2013.01); *G06K 9/00369* (2013.01); *G06T 7/004* (2013.01); *G06T 2207/10024* (2013.01); *G06T 2207/20021* (2013.01); *G06T 2207/20076* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

2009/0116698 A1    5/2009  Zhang et al.
2011/0273592 A1*  11/2011  Yamaoka ............ G06K 9/00362
                                                                    348/239
2012/0306919 A1*  12/2012  Suzuki ................ G06Q 30/0643
                                                                    345/633
2013/0022275 A1*   1/2013  Inoue ................. G06F 17/30256
                                                                    382/195
2013/0044944 A1*   2/2013  Wang ................... G06F 17/3025
                                                                    382/165
2013/0249908 A1*   9/2013  Black .................... G06T 7/0085
                                                                    345/420

FOREIGN PATENT DOCUMENTS

WO    WO/2011-152821 A1    12/2011

OTHER PUBLICATIONS

Hasan et al. "Segmentation using Deformable Spatial Priors with Application to Clothing," published in 2010.*
Yamaguchi et al. "Parsing Clothing in Fashion Photographs," presented at the IEEE Conference on Computer Vision and Pattern Recognition (CVPR), Jun. 16-21, 2012.*

(Continued)

*Primary Examiner* — Vu Le
*Assistant Examiner* — Alexander J Lesnick
(74) *Attorney, Agent, or Firm* — Hickman Palermo Becker Bingham LLP

(57) ABSTRACT

Techniques are provided for efficiently identifying relevant product images based on product items detected in a query image. In general, a query image may represent a digital image in any format that depicts a human body and one or more product items. For example, a query image may be an image for display on a webpage, an image captured by a user using a camera device, or an image that is part of a media content item, such as a frame from a video. Product items may be detected in a query image by segmenting the query image into a plurality of image segments and clustering one or more of the plurality image segments into one or more image segment clusters. The resulting image segments and image segment clusters may be used to search for visually similar product images.

20 Claims, 6 Drawing Sheets

(56) References Cited

OTHER PUBLICATIONS

Korean Patent Office, "Search Report" in application No. PCT/US2014/034434, dated Aug. 14, 2014, 10 pages.
Claims in Korean Application No. PCT/US2014/034434, dated Aug. 2014, 4 pages.
Taiwanese Patent Office, "Search Report" in application No. 103113196, dated Nov. 24, 2015, 4 pages.
Claims in Taiwanese Application No. 103113196, dated Nov. 2015, 4 pages.
Yang et al., "Articulated pose estimation with flexible mixtures-of-parts", CVPR, dated 2011, 8 pages.
Song et al., "Predicting Occupation via Human Clothing and Contexts", ICCV, dated 2011, 8 pages.
Silpa-Anan et al., "Optimised KD-trees for fast image descriptor matching", CVPR, IEEE, 8 Pages.
Rother et al., "GrabCut"—Interactive Foreground Extraction using Iterated Graph Cuts, TOG, vol. 23, 6 pages, dated 2004.
Ojala et al., "Multiresolution Gray Scale and Rotation Invariant Texture Classification with Local Binary Patterns", PAMI, dated 2002, 35 pages.
Muja et al., "Fast Approximate Nearest Neighbors With Automatic Algorithm Configuration", VISSAPP, dated 2009, 10 pages.
Lowe, David, "Distinctive Image Features from Scale-Invariant Keypoints", IJCV, dated 2004, 28 pages.
Liu et al., "Street-to-Shop: Cross-Scenario Clothing Retrieval via Parts Alignment and Auxiliary Set", CVPR, IEEE, dated 2012, 8 pages.
Liu et al., "Hi, Magic Closet, Tell Me What to Wear!", ACM Multimedia, dated 2012, 10 pages.
Gionis, et al., "Similarity Search in High Dimensions via Hashing", VLDB, dated 1999, 12 pages.
Felzenszwalb et al., "Efficient Graph-Based Image Segmentation", IJCV, dated 2004, 26 pages.
Cushen et al., "Real-Time Semantic Clothing Segmentation" ISVC, dated 2012, 10 pages.
Chen et al. "Describing Clothing by Semantic Attributes", ECCV submission, Paper ID 727, ECCV, dated 2012, 14 pages.
Avrithis et al., "Approximate Gaussian Mixtures for Large Scale Vocabularies", ECCV, dated 2012, 14 pages.

\* cited by examiner

102 RECEIVE A QUERY IMAGE

104 GENERATE AN ARTICULATED POSE ESTIMATION FOR THE QUERY IMAGE

106 GENERATE A PRODUCT PROBABILITY MAP BASED ON THE ARTICULATED POSE ESTIMATION

108 SEGMENT THE QUERY IMAGE INTO ONE OR MORE IMAGE SEGMENTS AND CLUSTER TWO OR MORE OF THE IMAGE SEGMENTS INTO ONE OR MORE IMAGE SEGMENT CLUSTERS

110 CLASSIFY ONE OR MORE OF THE IMAGE SEGMENTS AND IMAGE SEGMENT CLUSTERS INTO A PRODUCT CLASS

112 FOR ONE OR MORE OF THE IMAGE SEGMENTS AND/OR IMAGE SEGMENT CLUSTERS, PERFORM A SEARCH FOR RELEVANT PRODUCT IMAGES

FIG. 4A
FIG. 4B
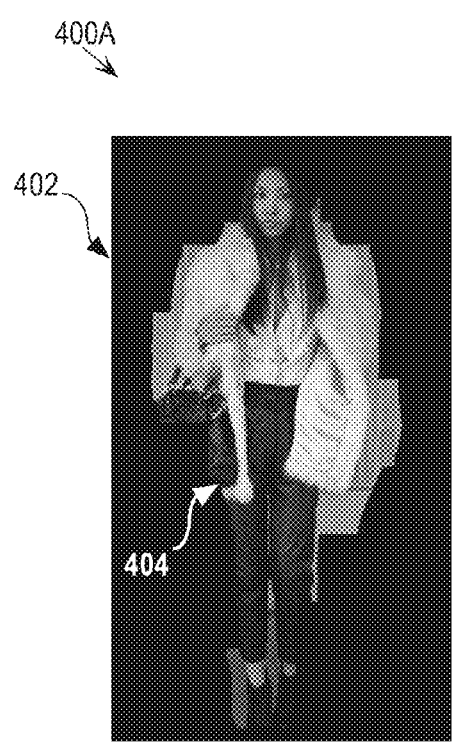
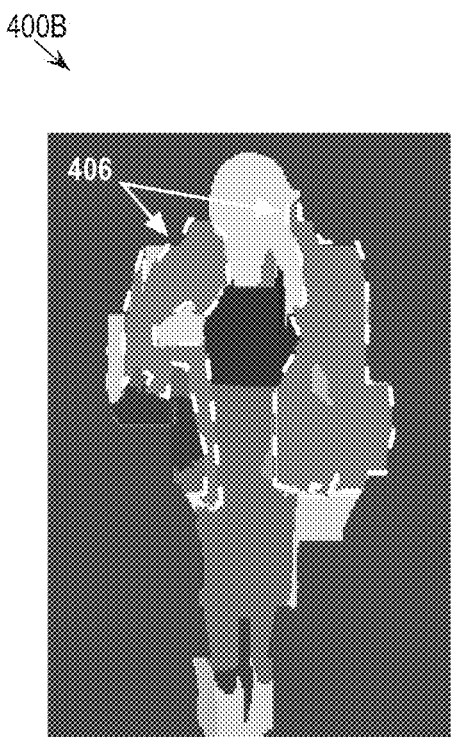

VISUAL CLOTHING RETRIEVAL

FIELD OF THE INVENTION

The present invention relates to image retrieval and, more particularly, to retrieving product images relevant to a query image.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many websites, such as news sites, blogs, and social networking sites, commonly present users with various forms of content displayed in association with one or more images. For example, a celebrity news website may include webpages that display news articles and related images about various celebrities; a social networking website may include webpages with user-generated content including images posted by users of the social networking site.

Operators of websites such as those described above may often desire to monetize the webpages of a website. One way that webpages may be monetized is by displaying advertisements in conjunction with the webpage content. In order to increase the likelihood that users viewing a particular webpage may be interested in displayed advertisements, website operators and/or advertisers may attempt to present advertisements that are relevant to the webpage content. For example, an operator of a celebrity news site may desire that advertisements relevant to the celebrity news content be displayed to users.

For websites that include images as part of webpage content, one way to display relevant advertisements may be to display advertisements that are relevant to the content of the images. However, a representation of an image's content for the purposes of searching for relevant advertisements may not be readily available based on the image data alone. One approach for determining the content of images for the purpose of selecting relevant advertisements is to use human labelers to manually identify elements depicted in an image and to select advertisements based on the identified elements. However, the human labeling of image content and the manual selection of relevant advertisements is both time and labor intensive and does not scale efficiently as the number of images to be processed increases.

BRIEF DESCRIPTION OF THE DRAWINGS

In the drawings:

FIG. 1 is a flow diagram that depicts a general process for identifying relevant product images based on a query image, in an embodiment;

FIG. 4A is an illustration of an example query image masked by a probability-based image mask, in an embodiment;

FIG. 4B is an illustration of the query image of FIG. 4A segmented into multiple image segments and image segment clusters, in an embodiment;

DETAILED DESCRIPTION

Figure 2:
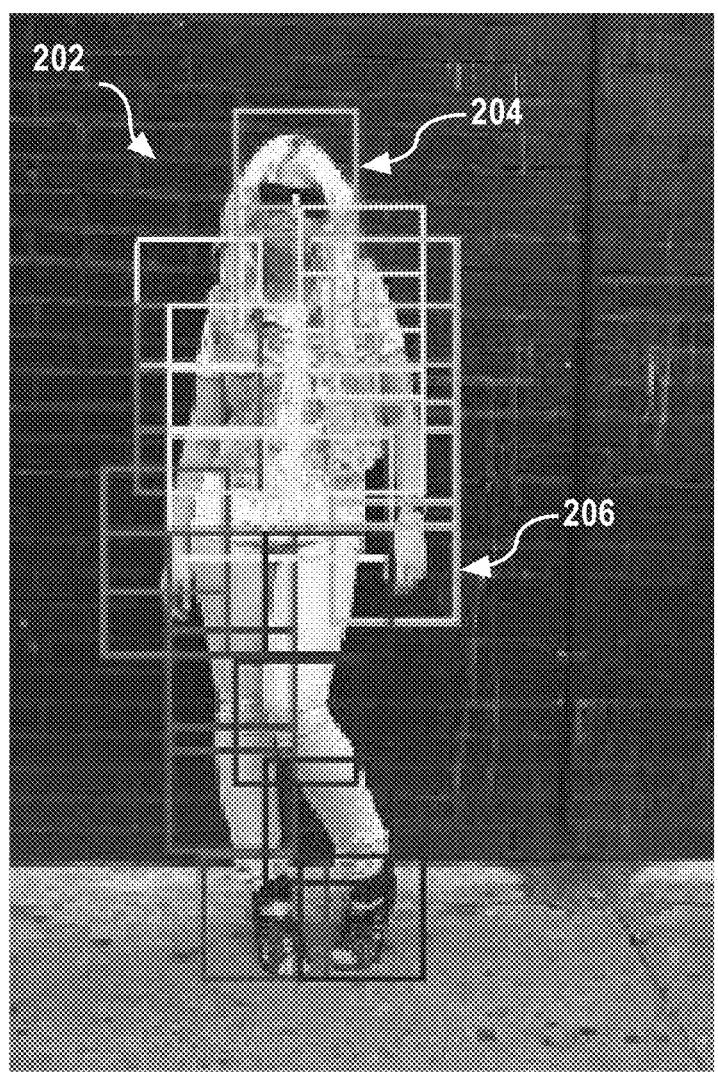
FIG. 2 is an illustration of an articulated pose estimation represented as a graphical overlay on a query image, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for efficiently identifying relevant product images based on product items detected in a query image. In general, a query image may represent a digital image in any format that depicts a human body and one or more product items. For example, a query image may be an image for display on a webpage, an image captured by a user using a camera device, or an image that is part of a media content item, such as a frame from a video. The product items depicted in a query image generally may include any tangible objects depicted in association a subject person in the query image. Non-limiting examples of product items include clothing items, clothing accessories, and other non-clothing items such as handbags, umbrellas, and electronic devices.

In one approach, product items may be detected in a query image by segmenting the query image into a plurality of image segments and clustering one or more of the plurality image segments into one or more image segment clusters. An image segment generally may represent a continuous region of a query image that is defined based on one or more shared characteristics within the image region, such as a shared color and/or texture of the image region. Because the regions of an image depicting a particular product item typically may exhibit similar color and texture characteristics (e.g., a blue shirt may be depicted as a continuous region of blue pixels with a similar texture), a generated image segment may correspond to an approximate location in a query image of the particular product item or portion of the product item.

Some product items depicted in a query image may not occupy a continuous image region. For example, a query image depicting a model wearing an open jacket may include two visually separate image regions corresponding to each half of the open jacket on either side of the model's body. Thus, as a result of the image segmentation process described above, some product items depicted in a query image initially may be segmented into two or more separate image segments. However, for the purposes of identifying relevant product images, it may be desirable to identify multiple image segments depicting a single product item as a single, merged image segment. Thus, in one embodiment, one or more image segments generated for a query image may be clustered into one or more image segment clusters. An image segment cluster may be generated, for example, by identifying two or more visually similar image segments and merging the image segments to be represented by a single image segment cluster.

In an embodiment, the resulting image segments and image segment clusters may be used to search for visually similar product images. In one approach, in order to narrow the search for similar product images, a product class is determined for one or more of the image segment and image segment clusters. A product class may be selected from a taxonomy of product items representing, for example, particular types of clothing (e.g., shirts, skirts, boots) and other types of accessories and product items (e.g., handbags, umbrellas, hairstyles, electronic devices). In one embodiment, a product class may be determined for a particular image segment or image segment cluster by comparing a spatial representation of the image segment to a training set of images with labeled regions of product classes.

In one approach, a classified image segment or image segment cluster may be used to search a database of product images for relevant product items. Because the product images represent known product items, each of the product images may be associated with one or more of the product classes from the same taxonomy used to classify image segments. Thus, a search for product images relevant to a classified image segment or image segment cluster may be focused on the set of product images associated with the same product class. In an embodiment, product images may be selected and retrieved from the database based on a visual similarity between the one or more product images and the particular image segment and/or image segment clusters.

Example Implementation

FIG. 1 is a flow diagram that depicts a process 100 for identifying relevant product images based on a query image, in an embodiment. At block 102, a query image is received. In general, a query image represents any digital image for which it is desired to find relevant product images based on product items detected in the query image. Embodiments are not limited to a particular source or format of the query image. For example, a query image may be received from a web developer or other user desiring the use the query image as part of content to be displayed on webpage. As another example, a query image may be received from a digital camera, mobile phone, tablet, or any other device capable of capturing an image. The steps of process 100 generally may be performed by any computing device, or combination thereof, capable of receiving a query image, including a server computer, desktop computer, laptop, smartphone, tablet, etc.

In an embodiment, a query image generally comprises a visual depiction of a human body wearing, holding, or otherwise associated with one or more product items. As one example, a query image may comprise a digital image for display on a webpage depicting a celebrity, model, or other person wearing one or more particular clothing items of interest. As another example, a query image may comprise a digital photo captured by a user's mobile phone and depicting a person wearing various clothing items in a typical environment such as a home or on a public street. As yet another example, a query image may comprise a frame from a particular media content depicting an actor or actress in association with various product items.

Articulated Pose Estimation

At block 104, an articulated pose estimation is generated for a received query image. An articulated pose estimation generally refers to a data representation of a particular pose associated with a human body depicted in an image. For example, an articulated pose estimation generated for a query image depicting a person standing in a particular pose may include a representation of an approximate location in the image corresponding to various parts of the person's body, such as the person's head, neck, arms, torso, etc.

In one embodiment, generating an articulated pose estimation for a query image comprises generating a set of square regions of the query image, where each of the square regions defines an area of the query image corresponding to an approximate location of a particular part of the human body. For example, one of the generated square regions may define an area corresponding to an approximate location of a subject person's head in the query image; another one of the square regions may define an area corresponding to an approximate location of the person's hand. The number of square regions generated may vary depending on a desired level of granularity in detecting parts of the human body. Embodiments are not limited to a particular articulated pose estimation algorithm and any suitable articulated pose estimation algorithm may be used for generating the square regions of the query image.

An example of generating an articulated pose estimation is described in Y. Yang and D. Ramanan, "Articulated pose estimation with flexible mixture-of-parts," IEEE Conference on Computer Vision and Pattern Recognition (CVPR), Colorado Spring, USA, 2011; the contents of which are incorporated herein by reference.

FIG. 2 illustrates an example of a query image with a visual representation of an articulated pose estimation overlaying the query image. FIG. 2 comprises an image 200 depicting a subject person 202 standing in a particular pose against a background.

FIG. 2 further comprises several square regions illustrated as bounded boxes overlaying the subject person 202, including example square regions 204, 206. The square regions overlaying image 200 may represent, for example, square regions generated by an articulated pose estimation for the subject person 202 depicted in image 200. For example, square region 204 is illustrated overlaying an area of image 200 corresponding to the location of the top of the head of subject person 202. Square region 206 is illustrated overlaying an area of image 200 corresponding to the location of the hand of subject person 202. Similarly, the remaining square regions are illustrated overlaying various other parts of the body. As illustrated by the square regions in FIG. 2, the square regions generated by an articulated pose estimation may overlap one or more other square regions.

The square regions of FIG. 2 are depicted for illustrative purposes only; other suitable articulated pose estimation algorithms may generate more or fewer regions and the regions may be of different sizes and shapes. Furthermore, the data representing an articulated pose estimation may be stored separately from the query image for which the articulated pose estimation is generated and a visual representation such as that illustrated in FIG. 2 need not be generated to carry out the other processing steps described herein.

Product Probability Map

Referring again to FIG. 1, at block 106, a product probability map is generated based on the articulated pose estimation. In general, a product probability map may be used to identify regions of the query image that are most likely to depict a product item. In one embodiment, a probability of particular regions of a query image depicting product items may be determined based on a training set of images with image regions labeled with particular product classes. In an embodiment, a product probability map may be used to generate an image mask that may be used to mask out portions of the query image that are determined to be unlikely to depict a product item, thereby enabling subsequent processing steps to focus on areas of the image that are likely to depict a product item.

In one embodiment, a product probability map is based on a spatial quantization of the square regions generated by the articulated pose estimation into multiple sub-regions, referred to herein as cells. For example, each of the square regions generated by an articulated pose estimation may be scaled to a uniform pixel width and divided into an N×N non-overlapping grid, where each grid location corresponds to an individual cell. Because the articulated pose estimation regions may be overlapping in area on the query image, a particular image pixel, defined by x and y coordinates relative to the image, may occupy a location covered by one or more cells of one or more of the articulated pose estimation regions. Thus, each pixel of an image may be represented by a function that indicates the cells of the articulated pose estimation regions that cover the location at which the pixel is located.

In an embodiment, a product probability map may be generated based on a training set of images with annotated product classes. For example, each image in the training set of images may include one or more image segments labeled with a particular product class. In one embodiment, a separate product probability map is generated for each product class included in the training set of images and merged together to generate a global product probability map. To create a probability map for a particular product class, each image pixel in the training set annotated with the particular product class casts a "vote" for the particular product class at each cell of the quantized articulated pose estimation region that covers the location at which the pixel is located, where casting a vote for a cell increments a value stored in association with the cell. In an embodiment, the "votes" of the pixels for a particular product class may be accumulated for the training set images that include the particular product class and normalized, resulting in a value between 0 and 1 for each cell of the articulated pose estimation regions. After a product probability map is generated for each of the individual product classes, a global product probability map may be defined as the union of the product probability classes for each product class, where each cell is associated with a value indicating a probability that the cell depicts a product item from any of the product classes depicted in the training set of images.

The process described above for generating product probability maps assumes that particular product items generally are depicted in a similar location on the human body in the training set of images. For example, by assuming that regions of the training set of images labeled with a "hat" product class generally may be located in a similar location (i.e., near the head of subject persons in the images), similar assumptions may be made with respect to query images. However, some product items may typically be located in multiple locations relative to a human body. For example, a woman's purse may typically be worn on either side of a woman's body, and wristwatches may typically be worn on either of a person's wrists. In one embodiment, in order to account for the different possible locations of such product items, the images of the training set of images may be divided vertically into two image halves. One half of the image may be processed according to the voting process described above. The other half of the image may be duplicated in mirror image form, and the mirror image may be used for the voting process described above instead of the original image. In this manner, product items that are typically depicted symmetrically on the left and right sides of the human body may be represented only on one side of the body in the training set of images in order to improve the accuracy of the voting process.

Figure 3:
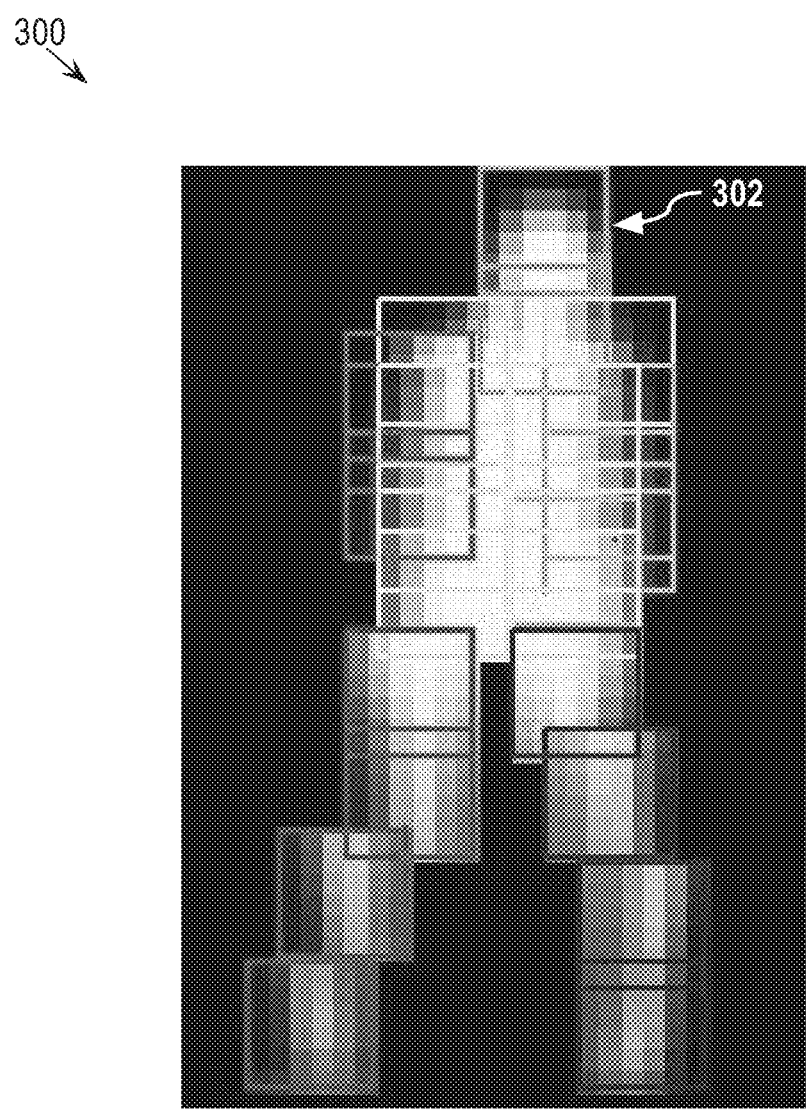
FIG. 3 is an illustration of a global product probability map represented as a graphical overlay on a query image, in an embodiment.

FIG. 3 is an illustration of a global product probability map represented as a graphical overlay on a query image. FIG. 3 comprises image 300 illustrating several articulated pose estimation regions overlaying the image, including square region 302.

The illustration of square region 302 in FIG. 3 includes a grid of cells inside of the region, as evidenced by square sub-regions illustrated with varying shades of gray. The grid of cells in square region 302 may correspond to an example spatial quantization of the articulated pose estimation regions, as described above. In the example of FIG. 3, the articulated pose estimation regions are each divided into a 6×6 grid of 36 cells. The shading illustrated in each of the cells may represent a probability level that each cell depicts a product item as determined by an associated global product probability map. For example, the dark cells in the upper-left and upper-right corners of square region 302 may represent cells for which relatively few votes were cast by any of the product classes and, thus, are unlikely to depict a product item. Conversely, the bright cells located in the bottom-center of square region 302 may represent cells for which many votes were cast by one or more product classes, indicating a higher likelihood that the cells depict a product item.

The probability map depicted in FIG. 3 is provided for illustrative purposes only; in general, a global product probability map may be stored in any number of data formats and a graphical illustration of a probability map such as that in FIG. 3 need not be generated to carry out the other processing steps described herein.

In an embodiment, a global product probability map may be used to generate a probability-based image mask. In this context, a probability-based image mask is an image mask that, when applied to a query image, produces a new image that is non-zero only in the regions of the image that are likely to depict a product item, as determined by a particular probability threshold. In one example, a probability threshold of 0.5 may be selected such that only cells of the articulated pose estimation regions that are more probable than not to depict a product item may be retained in the masked image; in other embodiments, other probability thresholds may be selected depending on particular use cases.

FIG. 4A is an illustration of an example query image masked by a probability-based image mask. In FIG. 4A, image 400A includes masked area 402 and non-masked area 404. For example, assume that an articulated pose estimation and global product probability map are generated for image 400A. The global product probability map generated for image 400A may then be used to generate a probability-based image mask that may be applied to mask those areas of image 400A that are outside of an articulated pose estimation region cell that is determined to be likely to depict a product item. For example, masked area 402 may represent such a masked area of image 400A. Conversely, non-masked area 404 may represent those areas of image 400A that were determined to be likely to depict a product item based on the global product probability map. In an embodiment, subsequent processing steps for image 400A may be focused on the non-masked area 404.

Image Segmentation and Clustering

Referring again to FIG. 1, at block 108, the query image is segmented into one or more image segments and two or more of the image segments are clustered into one or more image segment clusters. In an embodiment, segmentation of a query image generally comprises applying a segmentation algorithm to the query image, thereby causing the query image to be partitioned into two or more non-overlapping image segments.

In an embodiment, each image segment generated by an image segmentation algorithm represents a continuous region of any shape and size within the boundaries of the query image. The continuous region of the query image corresponding to a particular image segment generally may include image pixels that are grouped based on one or more characteristics shared by the pixels, such as a similar color and/or texture. By segmenting a query image, product items and other objects depicted in the query image may be isolated into discrete image segments that may be processed individually in subsequent processing steps.

In general, any suitable image segmentation algorithm may be used to segment the query image. In one embodiment, a parameterized segmentation algorithm may be used, where a parameterized value is specified to indicate a "depth" of the segmentation. The parameterized value generally corresponds to how discriminating the segmentation algorithm is when grouping pixels into individual image segments and, accordingly, generally corresponds to the overall number of segments that are generated. For further information about an example parameterized image segmentation algorithm, see the following: P. F. Felzenszwalb, D. P. Huttenlocher, "Efficient graph-based image segmentation," International Journal of Computer Vision, Volume 59, Number 2, September 2004; the contents of which are incorporated herein by reference.

Regardless of the image segmentation algorithm used, segmentation of a query image typically may result in some amount of "over-segmentation." In this context, over-segmentation refers to the generation of two or more image segments of the query image corresponding to a single product item or other object depicted in the image. For example, a query image depicting a frontal view of a subject person wearing an open jacket may be "over-segmented" into two separate image segments corresponding to the two halves of the open jacket. In order to formulate more precise searches for similar product images, two or more of the initially generated image segments may be clustered based on a visual similarity of the image segments to form a single image segment cluster that may be used to search for similar product images.

In one embodiment, an initially generated set of image segments may be clustered based on a vector-based representation of the image segments in a visual feature space. A visual feature space for the image segments may be based on one or more characteristics of the image segments including the color, texture, or any other characteristic of the image pixels contained in the image segments. The image characteristics may be used to generate an n-dimensional feature vector for each image segment which may be clustered using any suitable clustering algorithm. As one example of a clustering algorithm that may be used to cluster feature vectors, see the following: Y. Avrithis, Y. Kalantidis, "Approximate Gaussian Mixtures for Large Scale Vocabularies," European Conference on Computer Vision, Florence, Italy, October 2012; the contents of which are incorporated herein by reference.

FIG. 4B is an illustration of the query image of FIG. 4A segmented into multiple image segments and image segment clusters. FIG. 4B comprises query image 400B and several illustrated image segments, represented by continuous image regions of varying shades. For example, the image segments illustrated in FIG. 4B may represent image segments generated by applying an image segmentation algorithm to the image 400A. FIG. 4 further comprises a clustered image segment 406, illustrated by the two separate image segments of the same color and texture and bordered by broken lines. In the example of FIGS. 4A, 4B, clustered image segment 406 represents two visually separate image segments corresponding to the two halves of the jacket worn by the woman depicted in image 400A. Because the regions of image 400A depicting the jacket generally exhibit similar color and texture characteristics, the separate image segments generated for the two halves of the jacket may be merged to form a single image segment cluster in a clustering step, as described above.

Image Segment Classification

At block 110 of FIG. 1, one or more of the image segments and image segment clusters generated in block 108 are each classified into a product class. In an embodiment, a product class may be defined as part of a product class taxonomy. For example, a product class taxonomy may include various product classes representing different types of clothing (e.g., shirts, skirts, boots), clothing accessories (e.g., handbags, scarves, watches), and other non-clothing items (e.g., umbrellas, sports equipment). By classifying an image segment or image segment cluster into a particular product class, a more focused search may be conducted for similar product item images within the particular product class, as described further below.

In one embodiment, an image segment or image segment cluster may be classified into a product class by generating a representation of the spatial location of the image segment in relation to a human body and comparing the generated representation against a collection of stored spatial representations of labeled regions from a set of training images. For example, the training images may be the same as or similar to the training images used to generate a product probability map, as described above. The stored spatial representations may indicate where on the human body particular product classes generally are located in the training images. In one embodiment, the spatial locations of image segments of a query image and image segments of the training images may be represented by binary vectors. The binary vectors may be generated by a voting process, similar to the voting process used to generate a product probability map, that indicates cells of a normalized articulated pose estimation that contain pixels of the image segment.

In one embodiment, in order to determine a product class for a particular image segment, the binary vector generated for the particular image segment is measured for similarity to the binary vectors generated for the labeled clothing segments in the training set of images. One example of similarity measurement that may be used for binary vectors is the Jaccard similarity coefficient which defines the similarity of two binary vectors as the size of the intersection of the binary vectors divided by the size of the union of the binary vectors. The resulting similarity measurement values may be measured against a similarity threshold value to determine whether the candidate image segment is sufficiently similar to the labeled image segments of images of a particular product class in the training set. In an embodiment, a candidate image segment may be assigned a product class that is associated with the highest similarity measurement.

In an embodiment, the binary vectors for the training vectors may be indexed to increase the efficiency of searches. As one non-limiting example of an index that may be used to index the binary vectors of the training images, the training vectors may be indexed using a multi-probe Locality-Sensitive Hashing (LSH) index.

Product Image Retrieval

Referring again to FIG. 1, in block 112, for one or more of the image segments and/or image segment clusters, a search is performed for relevant product images. For example, attributes of an image segment cluster generated according to one or more the processing steps above may be used to search a collection of product images to identify product images that depict particular product items most visually similar to the image segment cluster. In an embodiment, one or more of the identified product images may be presented as a set of search results or used in further processing steps. For example, the identified product images may be used to generate one or more product advertisements for display on a webpage or other display.

In general, the searchable product images may be derived from any number of sources. For example, product images may derive from one or more product item catalogs used to display the product items on a webpage. Because the product images may be derived largely from images intended to display the product items, the product images typically may depict a particular product item against a mostly neutral background. In one embodiment, each of the product images may be stored in association with one or more of the product classes from the product class taxonomy described above corresponding to the product item depicted by the product image, and the product class assigned to an image segment or an image segment cluster is used to select product images.

In one embodiment, product images against which search requests may be generated may be pre-processed and indexed to facilitate more efficient searching. The pre-processing of a product image may include segmenting the product image into a product image segment and a non-product image segment. For example, the segmenting of product images may be used to remove background information and to retain an image segment that includes only the product item depicted in the image. In one particular embodiment, a segmentation algorithm such as the GrabCut algorithm may be used to segment the product images into a product image segment and a non-product image segment. For more information about the GrabCut algorithm, see the following: C. Rother, V. Kolmogorov, A. Blake, "GrabCut: Interactive foreground extraction using iterated graph cuts," ACM Transactions on Graphics (TOG), Volume 23 (3), Association for Computing Machinery, Aug. 1, 2004; the contents of which are incorporated herein by reference.

If a product item of a product image is depicted being worn by a human model or other person, portions of a generated product item segment may include one or more areas depicting human skin. The areas depicting human skin may result in a less precise image of the product item and therefore may be removed by filtering the skin areas out of the image segment. In an embodiment, the skin areas may be filtered out by using image samples of human skin as a mask to filter out areas of the image segment that correspond to skin, resulting in an isolation of the product item in the image segment.

In an embodiment, a product item image segment may be used to generate a feature vector for comparison to query image segments. In an embodiment, a feature vector for product item image segments may be based on color, texture, or any other image characteristics may be extracted to characterize a particular image segment. In an embodiment, the product images and associated feature vectors may be stored in a database and index. In one particular embodiment, a k-nearest neighbor index may be used to index the associated feature vectors. An index may be created for the entire collection of feature vectors or separate indexes may be created for each product class. If separate indexes are created for each product class, at query time for a particular image segment, only the index corresponding to the product class associated with the image segment may be searched.

In one embodiment, each image segment or image segment cluster identified in the query image and that is associated with a product class may be used to search for visually similar product items. For example, an image segment cluster of a query image that is associated with a "jacket" product class may be used to search an indexed collection of product item images associated with the "jacket" product class. The result product item images may be selected based on a similarity between the feature vector generated for the image segment cluster and the feature vectors of the result product item images.

Figure 5:
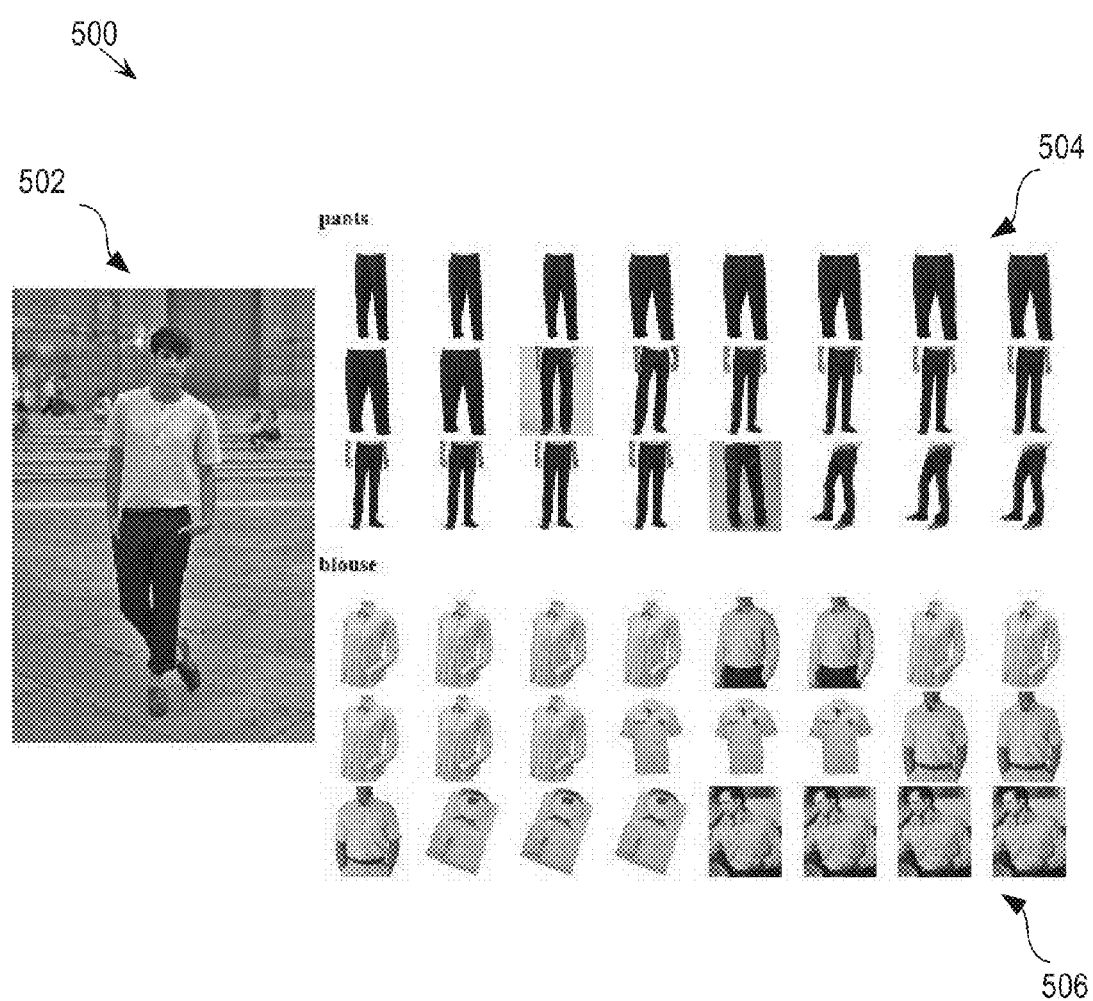
FIG. 5 is an illustration of a product image results display, in an embodiment.

FIG. 5 is an illustration of an example product image results display 500. Results display 500 comprises an example query image 502 and product image results 504, 506. Query image 502 depicts a man wearing various articles of clothing including pants and a shirt, or blouse. Query image 502 may be processed according to one or more of blocks 102-112 of FIG. 1 described above, resulting in product image results 504, 506. Product image results 504, 506 are provided only as two examples; in practical embodiments, any number of product image result displays may be generated based on the number of detected product item classes and other user preferences.

Each of product image results 504, 506 comprises several product images depicting product items that are visually similar to a product item depicted in query image 502. For example, product image results 504 includes several product images of pants that are visually similar to the pants worn by the man depicted in query image 502. Similarly, product image results 506 includes several product images of blouses that are visually similar to the blouse worn by the man in query image 502.

In one embodiment, the product image results may be used to generate one or more advertisements for display on a website. For example, for a query image that is to be displayed on a website as part of webpage content, one or more of the result product images for the query image may be used to generate advertisements for display in association with the query image. The advertisements may, for example, provide links to other websites where users may purchase the product items depicted in the product images. In another embodiment, product image results may be presented to a user for the user to select the most visually similar product items. User-assisted selection of product item images generated by the processes described above may be used to generate more accurate advertisement displays.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
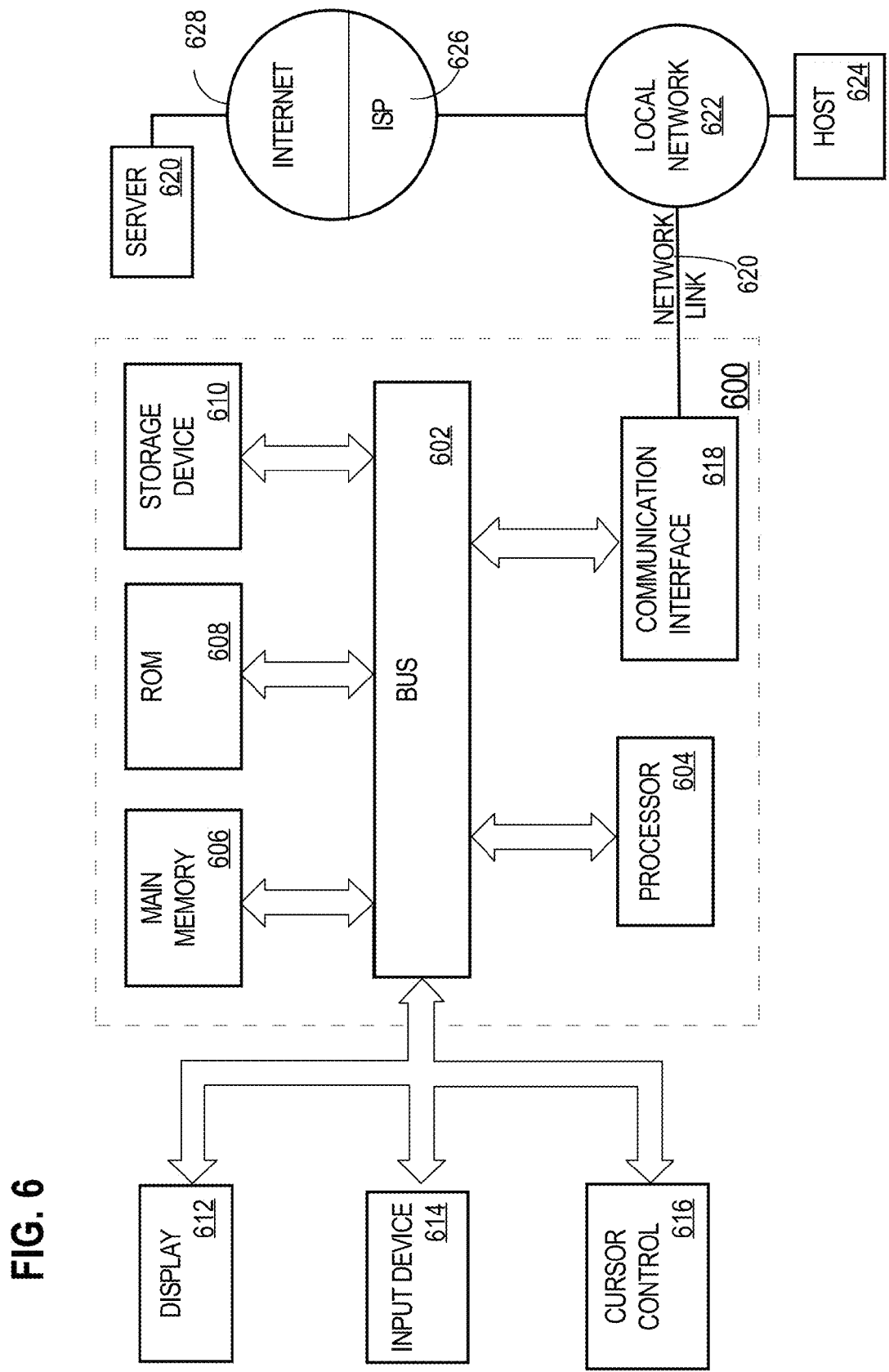
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   without segmenting an image generating a pose estimation, determining one or more regions of the image that are not likely to depict a product item;
   generating a masked image that masks the one or more regions;
   segmenting the masked image into a plurality of image segments based on shared characteristics of pixels that comprise the masked image, each image segment comprising a plurality of pixels that: form a continuous region of the masked image, and
   share a characteristics,
   wherein two or more image segments of the plurality of image segments depict a same product;
   clustering the two or more image segments from the plurality of image segments into an image segment cluster;
   determining, for the image segment cluster, a particular product class of a plurality of product classes;
   retrieving, from an image database, one or more product images that are associated with the particular product class and that are selected based on a visual similarity between the one or more product images and the image segment cluster;
   wherein the method is performed by one or more computing devices.

2. The method of claim 1, further comprising:
   generating, for the image segment cluster, a representation of a spatial location of the image segment cluster;
   determining the particular product class for the image segment cluster based on a training set of images comprising one or more mappings between particular spatial locations and particular product classes.

3. The method of claim 2, wherein the spatial location is defined relative to a location on a human body.

4. The method of claim 1, wherein the two or more image segments are determined to be visually similar based on characteristics of the two or more image segments including image color and image texture.

5. The method of claim 1, wherein the two or more image segments are spatially separated in the image.

6. The method of claim 1, further comprising, for each of the one or more product images:
   segmenting the product image into a product image segment and a non-product image segment;
   storing the product image segment in an image database in association with a product class.

7. The method of claim 1, wherein a product class of the plurality of product classes represents a type of clothing item.

8. The method of claim 1, wherein the image comprises a depiction of a human and one or more clothing items.

9. A non-transitory computer-readable medium carrying instructions which, when processed by one or more processors, cause:
   without segmenting an image generating a pose estimation, determining one or more regions of the image that are not likely to depict a product item;
   generating a masked image that masks the one or more regions;
   segmenting the masked image into a plurality of image segments based on shared characteristics of pixels that comprise the masked image, each image segment comprising a plurality of pixels that: form a continuous region of the masked image, and
   share a characteristics,
   wherein two or more image segments of the plurality of image segments depict a same product;
   clustering the two or more image segments from the plurality of image segments into an image segment cluster;
   determining, for the image segment cluster, a particular product class of a plurality of product classes;
   retrieving, from an image database, one or more product images that are associated with the particular product class and that are selected based on a visual similarity between the one or more product images and the image segment cluster.

10. The non-transitory computer-readable medium as recited in claim 9, further comprising additional instructions which, when processed by the one or more processors, cause:
    generating, for the image segment cluster, a representation of a spatial location of the image segment cluster;
    determining the particular product class for the image segment cluster based on a training set of images comprising one or more mappings between particular spatial locations and particular product classes.

11. The non-transitory computer-readable medium as recited in claim 10, wherein the spatial location is defined relative to a location on a human body.

12. The non-transitory computer-readable medium as recited in claim 9, wherein the two or more image segments are determined to be visually similar based on characteristics of the two or more image segments including image color and image texture.

13. The non-transitory computer-readable medium as recited in claim 9, wherein the two or more image segments are spatially separated in the image.

14. The non-transitory computer-readable medium as recited in claim 9, further comprising additional instructions which, when processed by the one or more processors, cause, for each of the one or more product images:
    segmenting the product image into a product image segment and a non-product image segment;
    storing the product image segment in an image database in association with a product class.

15. The non-transitory computer-readable medium as recited in claim 9, wherein a product class of the plurality of product classes represents a type of clothing item.

16. The non-transitory computer-readable medium as recited in claim 9, wherein the image comprises a depiction of a human and one or more clothing items.

17. A system comprising:
an image database storing one or more product images;
a computer comprising a processor and a memory, the memory storing one or more sequences of instructions which when executed cause the computer to perform:
without segmenting an image generating a pose estimation, determining one or more regions of the image that are not likely to depict a product item;
generating a masked image that masks the one or more regions;
segmenting the masked image into a plurality of image segments based on shared characteristics of pixels that comprise the masked image, each image segment comprising a plurality of pixels that: form a continuous region of the masked image, and
share a characteristics,
wherein two or more image segments of the plurality of image segments depict a same product;
clustering the two or more image segments from the plurality of image segments into an image segment cluster;
determining, for the image segment cluster, a particular product class of a plurality of product classes;
retrieving, from an image database, one or more product images that are associated with the particular product class and that are selected based on a visual similarity between the one or more product images and the image segment cluster.

18. The system of claim 17, the one or more sequences of instructions further causing the computer to perform:
generating, for the image segment cluster, a representation of a spatial location of the image segment cluster;
determining the particular product class for the image segment cluster based on a training set of images comprising one or more mappings between particular spatial locations and particular product classes.

19. The system of claim 18, wherein the spatial location is defined relative to a location on a human body.

20. The system of claim 17, the one or more sequences of instructions further causing the computer to perform:
segmenting the product image into a product image segment and a non-product image segment;
storing the product image segment in an image database in association with a product class.

* * * * *